(12) United States Patent
Just et al.

(10) Patent No.: US 12,504,352 B2
(45) Date of Patent: Dec. 23, 2025

(54) MATTRESS TEST MANIKIN-LATERAL POSITION

(71) Applicant: Madad Pty Ltd, Wacol (AU)

(72) Inventors: Morrison Just, Wacol (AU); Daniel Green, Wacol (AU)

(73) Assignee: Madad Pty Ltd (AU)

( * ) Notice: Subject to any disclaimer, the term of this patent is extended or adjusted under 35 U.S.C. 154(b) by 285 days.

(21) Appl. No.: 18/554,264

(22) PCT Filed: Apr. 14, 2022

(86) PCT No.: PCT/AU2022/050337
§ 371 (c)(1),
(2) Date: Oct. 6, 2023

(87) PCT Pub. No.: WO2022/217317
PCT Pub. Date: Oct. 20, 2022

(65) Prior Publication Data
US 2025/0003838 A1    Jan. 2, 2025

(30) Foreign Application Priority Data

Apr. 14, 2021  (AU) ................. 2021901099

(51) Int. Cl.
*G01M 99/00* (2011.01)
*A47C 31/12* (2006.01)
(52) U.S. Cl.
CPC ......... *G01M 99/001* (2013.01); *A47C 31/123* (2013.01)

(58) Field of Classification Search
CPC .................... G01M 99/001; A47C 31/123
See application file for complete search history.

(56) References Cited

U.S. PATENT DOCUMENTS 4,669,302 A    6/1987  Wagner et al.
5,970,789 A *  10/1999  Meyer ................. A47C 31/126
                                                73/172

(Continued)

FOREIGN PATENT DOCUMENTS

CN    103169477    6/2013
CN    104799613    7/2015

*Primary Examiner* — Paul M. West
(74) *Attorney, Agent, or Firm* — Dureska & Moore, LLC; David P. Dureska; Benjamin J. Chojnacki

(57) ABSTRACT

A system for measuring spinal and/or skeletal angles of a manikin in a lateral position. The system comprises a manikin, the manikin comprising one or more articulating joints and a spinal and/or skeletal profile defining a manikin profile, a suspension frame, the suspension frame suspending the manikin, one or more measuring devices connected to the manikin at one or more measuring points, and a support surface, the support surface adjustable in at least a vertical axis. The manikin comprises a suspended configuration when suspended by the suspension frame, and a supported configuration when supported by the support surface. The one or more measuring devices measures differences in the spinal and/or skeletal angles of the manikin profile between the suspended configuration and the supported configuration. The invention provides a system to replicate and measure human physiology when engaged with a surface.

19 Claims, 5 Drawing Sheets

(56) References Cited

U.S. PATENT DOCUMENTS

| | | | | |
|---|---|---|---|---|
| 6,220,088 B1* | 4/2001 | Scales | ................... | G09B 23/32 |
| | | | | 73/781 |
| 7,891,259 B2* | 2/2011 | Kim | ................... | G01M 99/001 |
| | | | | 73/862.391 |
| 2019/0021929 A1 | 1/2019 | Einav et al. | | |

* cited by examiner

MATTRESS TEST MANIKIN-LATERAL POSITION

This application claims the benefit of International Application No. PCT/AU2022/050337, filed Apr. 14, 2022, which claims the benefit of Australian Patent Application No. 2021901099, filed Apr. 14, 2021.

FIELD OF THE INVENTION

The present invention relates to a system for measuring spinal and/or skeletal angles. In particular, although not exclusively, the invention relates to a system for measuring spinal and/or skeletal angles of a manikin in a lateral position on a mattress.

BACKGROUND TO THE INVENTION

Numerous types of human test apparatuses and systems are commonly used to determine usability, ergonomics, and safety. Typically, a manikin is used to simulate the effects of a human body's interaction with a product, or the effects of an environmental situation on the human body.

For example, the apparatus disclosed by U.S. Pat. No. 4,669,302, titled 'Deflection and topography assessment mechanism anthropomorphically natural', defines a manikin used to depress a surface such as a mattress, allowing analysis of a resulting surface contour and pressure distribution over the manikin. Tests such as these focus exclusively on the supine, i.e. back sleeping position, and provide limited data on human physiology as, primarily, the motivation is to analyse the mattress contour formed by the weighted manikin. These methods also lower a manikin onto a mattress in order to evaluate the contours and depressions caused by the manikin.

Other systems such as U.S. Pat. No. 5,628,230, titled 'Method and apparatus for testing the efficacy of patient support systems', disclose anthropomorphic models for measuring pressure distribution over an anthropomorphic manikin, primarily for the purpose of analysing the likelihood of pressure related complications such as decubitus ulcers and similar conditions.

There is therefore a need for an improved system for measuring a manikin on a support surface, in particular for a system for measuring spinal and/or skeletal angles of a manikin in a lateral position on a mattress.

OBJECT OF THE INVENTION

It is a preferred object of the invention to provide systems and/or apparatuses and/or methods that address or ameliorate one or more of the aforementioned problems of the prior art and/or provide a useful commercial alternative.

SUMMARY OF THE INVENTION

The present invention relates to a system for measuring spinal and/or skeletal angles. In one form, although not necessarily the broadest form, the invention resides in a system for measuring spinal and/or skeletal angles of a manikin in a lateral position, the system comprising: a manikin, the manikin comprising one or more articulating joints and a spinal and/or skeletal profile defining a manikin profile; a suspension frame, the suspension frame suspending the manikin; one or more measuring devices connected to the manikin at one or more measuring points; and a support surface, the support surface adjustable in at least a vertical axis; wherein the manikin comprises a suspended configuration when suspended by the suspension frame; the manikin comprises a supported configuration when supported by the support surface; and the one or more measuring devices measures differences in the spinal and/or skeletal angles of the manikin profile between the suspended configuration and the supported configuration.

Preferably, the one or more articulating joints are adjustable in resistance and/or angle of articulation.

Preferably, the spinal and/or skeletal profile in the suspended configuration is sagittal to the manikin.

Preferably, the support surface is raised in the vertical axis to support the manikin.

Preferably, the manikin comprises a torso, and wherein the suspension frame further comprises a vertical stabiliser connected to the torso and maintains the torso in the lateral position.

Further preferably, the vertical stabiliser allows vertical movement of the torso along the vertical stabiliser.

Further preferably, the vertical stabiliser allows coronal plane movement of the torso along the vertical stabiliser.

Preferably, the manikin comprises an articulating hip joint that hinges and rotates.

Preferably, the manikin is suspended by the suspension frame via a plurality of cords.

Further preferably, the plurality of cords are tight when in the suspended configuration, and the plurality of cords are slack when in the supported configuration.

Preferably, the full weight of the manikin is on the suspension frame when in the suspended configuration, and the full weight of the manikin is on the support surface when in the supported configuration.

Preferably, the support surface is a mattress.

Preferably, the manikin comprises a head that is independently supported by a counterweight, and wherein the head is maintained in a neutral position along the spinal profile.

Preferably, the one or more measuring points are located along the spinal spinal and/or skeletal profile.

Preferably, the measuring devices are electronic devices mounted on the suspension frame and connected to the manikin at the one or more measuring points.

Preferably, the system comprises a control interface, wherein the control interface is configured to control raising and lowering of the support surface.

Further preferably, the control interface is configured to process, display, and/or output data from the one or more measurement devices.

Preferably, the manikin is sized according to a size between a 99th percentile male and a 1st percentile female.

Preferably, the manikin is weighted according to a weight between a 99th percentile male and a 1st percentile female.

Preferably, the system comprises a set of acceptable limits for assessing the changes in spinal and/or skeletal angles of the manikin profile.

BRIEF DESCRIPTION OF THE DRAWINGS

To assist in understanding the invention and to enable a person skilled in the art to put the invention into practical effect, a preferred embodiment of the invention will be described by way of example only with reference to the accompanying drawings, in which.

DETAILED DESCRIPTION OF THE INVENTION

Figure 1:
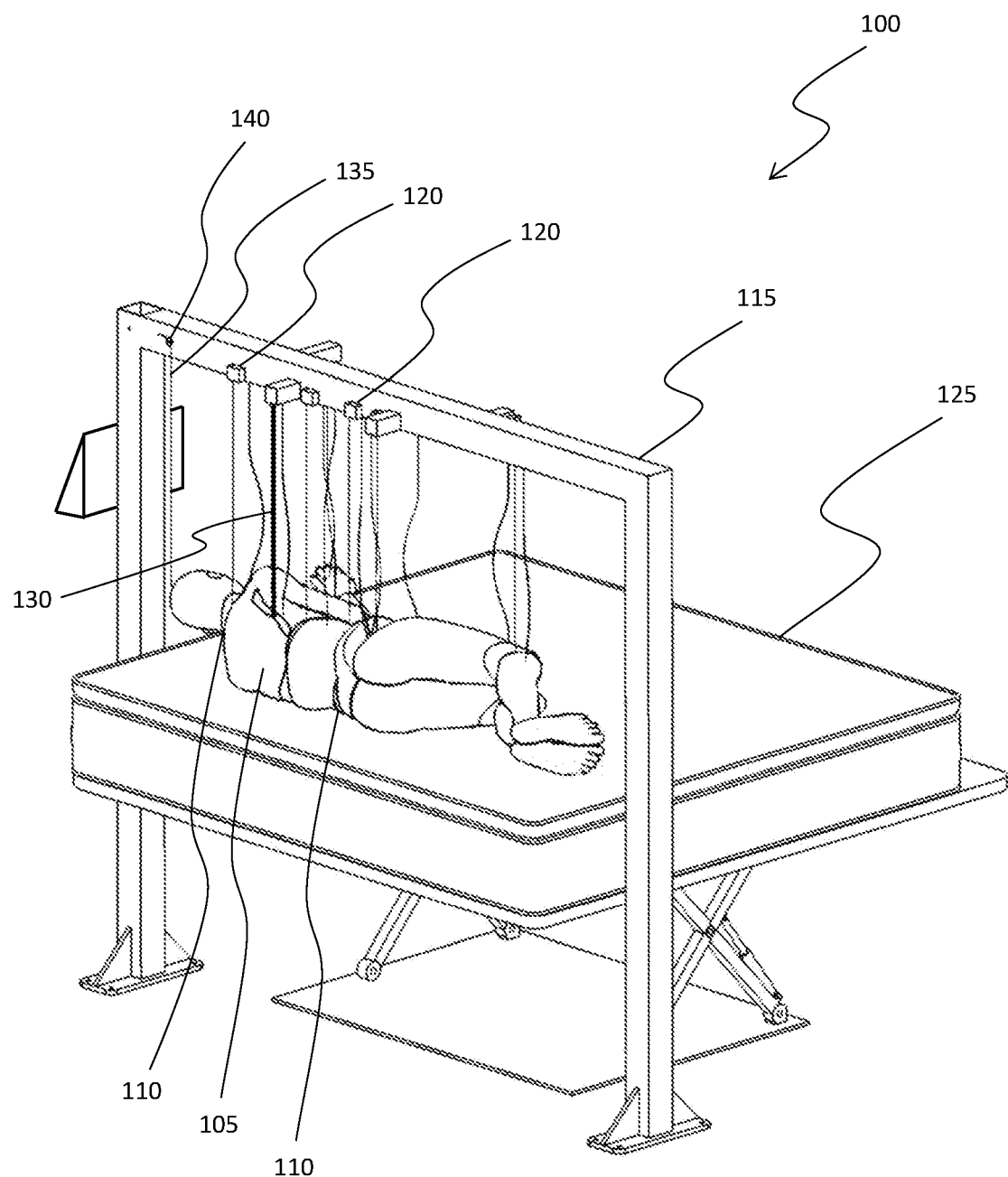
FIG. 1 is a perspective view of a system for measuring spinal and/or skeletal angles, with a manikin in a supported configuration.

The present invention relates to a system for measuring spinal and/or skeletal angles. However, it will be appreciated that embodiments of the present invention can apply to other forms of manikin testing systems. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

According to one aspect, the present invention is defined as a system for measuring spinal and/or skeletal angles of a manikin in a lateral position, the system comprising: a manikin, the manikin comprising one or more articulating joints and a spinal and/or skeletal profile defining a manikin profile; a suspension frame, the suspension frame suspending the manikin; one or more measuring devices connected to the manikin at one or more measuring points; and a support surface, the support surface adjustable in at least a vertical axis; wherein the manikin comprises a suspended configuration when suspended by the suspension frame; the manikin comprises a supported configuration when supported by the support surface; and the one or more measuring devices measures differences in the spinal and/or skeletal angles of the manikin profile between the suspended configuration and the supported configuration.

Advantages of some embodiments of the present invention include the ability to measure changes to the spinal and/or skeletal profile in the lateral position instead of only the supine. By suspending the manikin in the lateral position, and raising a support surface to meet the manikin, the present system is able to easily establish a neutral spinal and/or skeletal profile and efficiently analyse the predicted spinal and/or skeletal profile of a person lying on his or her side on the support surface. By implementing articulating joints, the manikin is also able to more closely imitate the lateral sleeping position and movement of a human being when settling into a support surface such as a mattress. Measuring devices connected to the manikin are able to record any changes to the spinal and/or skeletal profile caused by interaction with the support surface, providing data on any height, rotation, and angular deviation or changes of the spinal and/or skeletal profile which make up the manikin profile. The present invention therefore assists in data gathering and measurement of sleep physiology, with particular emphasis on skeletal and spinal angles in the lateral or side sleeping position.

Those skilled in the art will appreciate that not all of the above advantages are necessarily included in all embodiments of the present invention.

FIG. 1 is a perspective view of a system for measuring spinal and/or skeletal angles, with a manikin in a supported configuration. In one form, although not necessarily the broadest form, the invention resides in a system 100 for measuring spinal and/or skeletal angles of a manikin in a lateral position, the system 100 comprising: a manikin 105, the manikin comprising one or more articulating joints 110 and a spinal and/or skeletal profile defining a manikin profile; a suspension frame 115, the suspension frame 115 suspending the manikin 105; one or more measuring devices 120 connected to the manikin 105 at one or more measuring points; and a support surface 125, the support surface 125 adjustable in at least a vertical axis; wherein the manikin 105 comprises a suspended configuration when suspended by the suspension frame 115; the manikin 105 comprises a supported configuration when supported by the support surface 125; and the one or more measuring devices 120 measures differences in the spinal and/or skeletal angles of the manikin profile between the suspended configuration and the supported configuration.

In a preferred embodiment, the one or more articulating joints 110 are adjustable in resistance and/or angle of articulation. This allows the manikin 105 to be adjusted and closely imitate the pose and response of a human being as the manikin 105 settles onto the support surface 125. Further preferably, the support surface 125 is a mattress. The person skilled in the art will understand that the manikin 105 may gradually settle over time, depending on the firmness of the support surface 125 or mattress.

In a preferred embodiment, the manikin 105 is positioned to lie side-on to replicate a lying position of human subjects. As mentioned, the adjustable articulating joints 110 allow the manikin 105 to be fine-tuned to achieve desired angles when lying on the support surface 125. Optionally, these adjustments may be made through internal components that are adjustable to increase or decrease resistance. The desired angles and limitations may be established through ergonomic data collection or according to medical research. Preferably, the articulating joint 110 at the hip of the manikin 105 replicates human movement parameters by providing limit and tension adjustable joints that both hinge and rotate. By allowing the hips of the manikin 105 to hinge sideways and also rotate, the knees of the manikin 105 are able to rest properly on the support surface 125 and closely replicate the natural flex and rotation of the human body. The person skilled in the art will also understand that limitations on the desired angles may be imposed on the articulating joints 110 to simulate flexibility and movement ranges of the human body, including restrictions where necessary, such as in the context of rehabilitation.

In a preferred embodiment, the manikin 105 comprises a torso, and the suspension frame 115 further comprises a vertical stabiliser 130 connected to the torso of the manikin 105. The vertical stabiliser 130 retains the torso and effectively keeps the torso upright, so that the manikin 105 is maintained in a position where the shoulders are vertically stacked. This allows the manikin 105 to replicate with greater accuracy the physical pose of a lateral lying human being and maintain reference to the suspension frame 115. With the vertical stabiliser 130 connecting the manikin 105 to the suspension frame 115, the manikin 105 is able to move along the vertical stabiliser vertically, horizontally, and rotationally on a coronal plane or a plane parallel to the vertical plane of the suspension frame 115. A counterweighted cord 135 is also used to support the head of the manikin 105, wherein the counterweighted cord 135 is fed through rollers 140 and into the body of the suspension frame 115.

Figure 2:
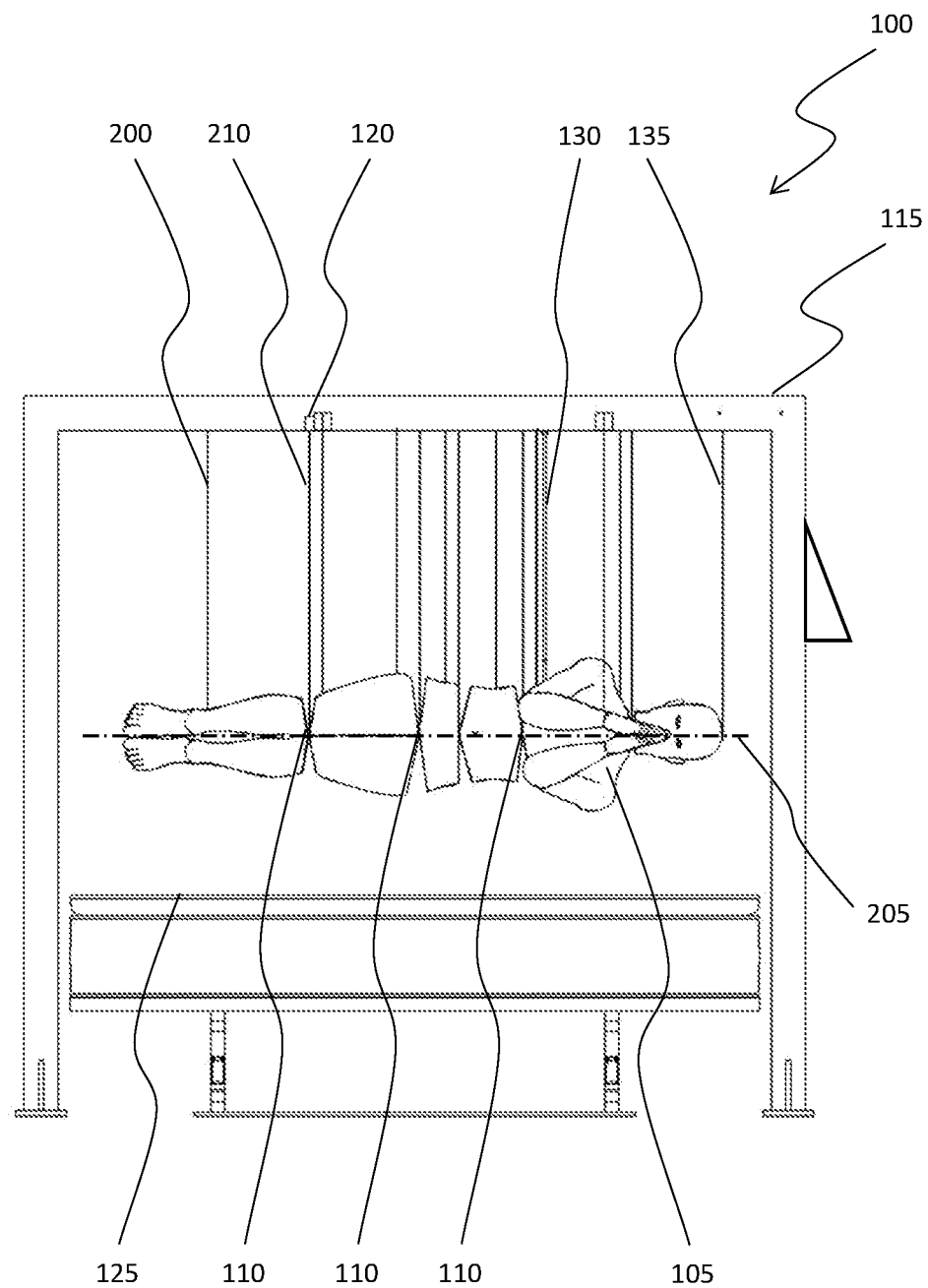
FIG. 2 is a side view of the system of FIG. 1 with a manikin in a suspended configuration.

FIG. 2 is a side view of the system of FIG. 1 with the manikin 105 in a suspended configuration. In a preferred embodiment, the manikin 105 is suspended by the suspension frame 115 via a plurality of cords 200. In the suspended configuration, the plurality of cords 200 are tight and suspend the manikin 105 in a neutral position. With the manikin 105 attached to the suspension frame 115 via the plurality of cords 200, the full weight of the manikin is on the suspension frame 115 when in the suspended configuration.

In a preferred embodiment, the spinal and/or skeletal profile, defining the manikin profile, in the suspended configuration is sagittal to the manikin 105, representing a spine and/or skeletal profile running up and down the human body in a symmetrical and/or straight line. By way of reference, this is illustrated by a centre line 205. The suspended manikin 105 can be levelled and calibrated in the suspended configuration so that a neutral spinal and/or skeletal profile is established, and the spinal and/or skeletal profile is symmetrical and/or straight when viewed from the front of the manikin 105. The measuring devices 120 can also be calibrated or zeroed in the suspended configuration. Preferably, the measuring devices 120 are connected to, or are configured to measure, measuring points located along the spinal and/or skeletal profile of the manikin 105. Optionally, the measuring devices 120 can be arranged so that the manikin profile is defined and/or limited by other physiological structures correlating to muscular alignment and/or other anatomical structures such as tendons, joints, and connective tissue.

Preferably, the measuring devices 120 are electronic devices mounted on the suspension frame 115 and then connected to the manikin 105 at the measuring points. The person skilled in the art will understand that the measuring devices 120 may be analogue or digital gauges calibrated to zero when the respective measuring point is on the established neutral spinal profile. In a preferred embodiment, the one or more measuring devices 120 are string potentiometers which draw in strings 210 under tension, thereby measuring the vertical movement and linear position of the measuring points. Preestablished distances between each measuring point running along the spinal and/or skeletal profile will allow changes in the spinal and/or skeletal profile between the suspended configuration and the supported configuration to be accurately measured and calculated, forming a complete and accurate representation of the spinal and/or skeletal profile defining the manikin profile.

Figure 3:
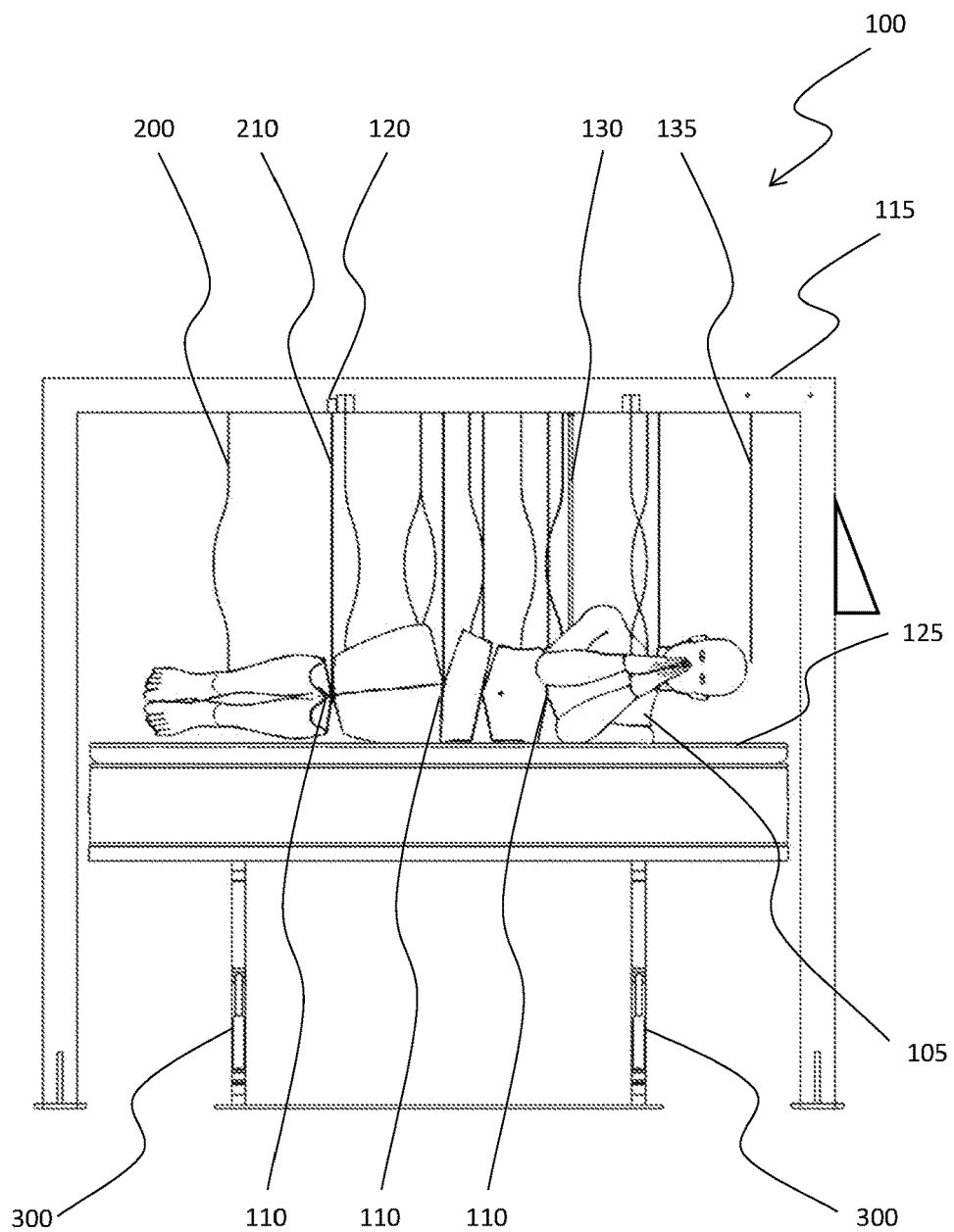
FIG. 3 is a side view of the system of FIG. 1 with the manikin in the supported configuration.

FIG. 3 is a side view of the system of FIG. 1 with the manikin in the supported configuration. In a preferred embodiment, the full weight of the manikin 105 is on the support surface 125 when in the supported configuration. With the full weight of the manikin 105 resting on the support surface 125, the plurality of cords 200 are completely slack. As such, the plurality of cords 200 must be strong enough to suspend the manikin 105 and be supple enough so as to not influence or impact the measurement data. Though the plurality of cords 200 for suspending the manikin 105 are slack, the strings 210 of the one or more measuring devices 120 remain taught.

The plurality of cords 200 become slack after the full weight of the manikin 105 is supported by the support surface 125. However, an exception to this is the counterweighted cord 135 suspending the head of the manikin 105, wherein the counterweighted cord 135 remains taught and the head is maintained in a neutral position along the spinal profile even as the weight of the manikin 105 is taken up by the support surface 125. The counterweighted cord 135 independently supporting the head mimics the elevation of a pillow, mitigating any inadvertent distortion of the spinal profile caused by an unnaturally angled neck, and maintains the pose of a sleeping human using a pillow. Without the counterweighted cord 135 holding the head in a neutral position, the position and angle of an adjoining torso section may be influenced. To achieve balance, the counterweighted cord 135 may be routed over a series of rollers 140 (not shown) running the counterweighted cord 135 into the supporting frame 115 and down to an adjustable counterweight so that the head is consistently held in the neutral position along the spinal and/or skeletal profile defining the manikin profile.

In a preferred embodiment, the support surface 125 is raised in the vertical axis to support the manikin 105. The support surface 125 may be raised by one or more lifts 300 which may take on the form of pneumatic lift. As the one or more lifts 300 raises the support surface 125, the support surface is offered up from below to meet and engage the passively suspended manikin 105. The person skilled in the art will understand that various types of mechanical lifts may be used, along with levelling devices, as long as the support surface 125 is able to stably engage the suspended manikin 105.

Figure 4:
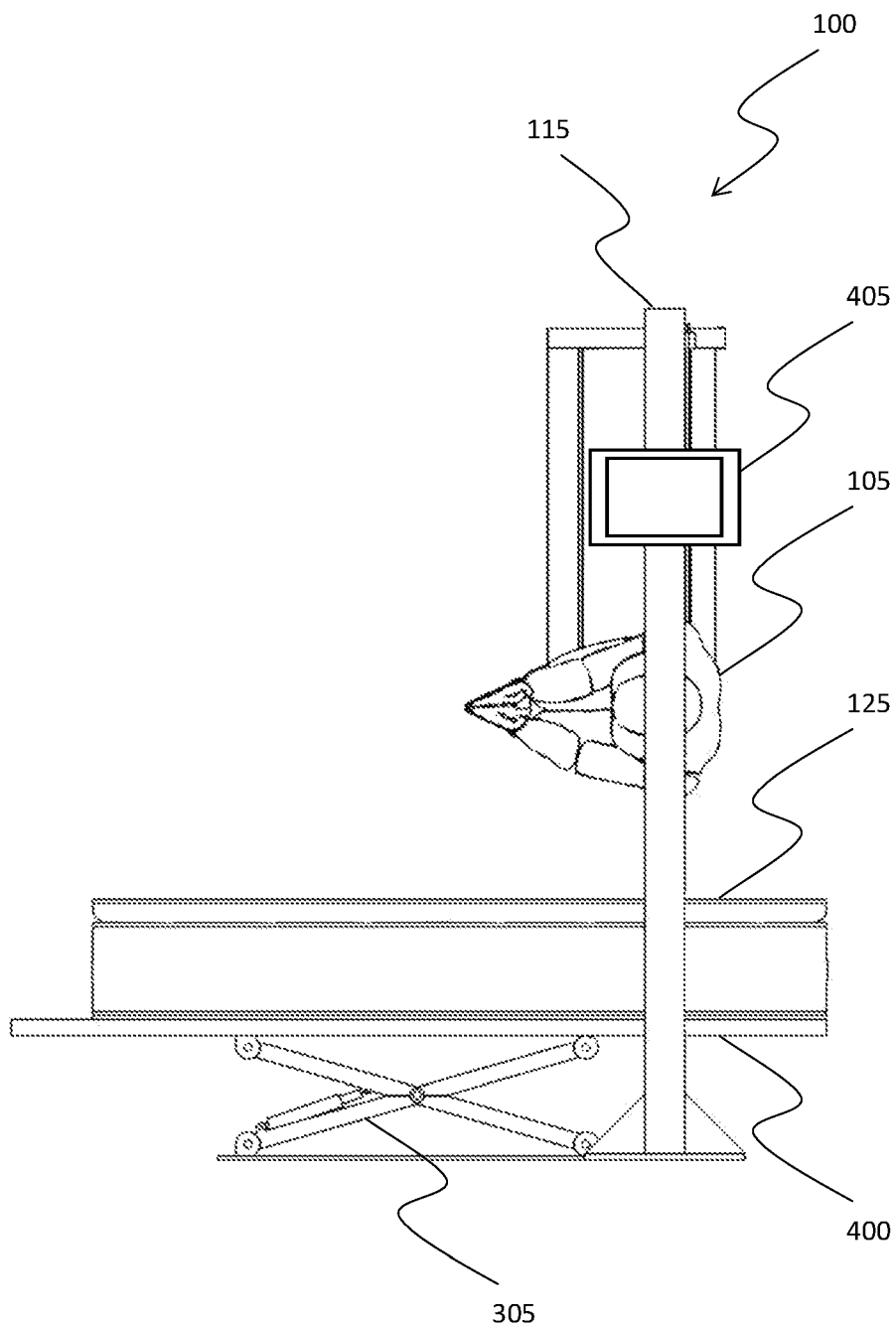
FIG. 4 is a further side view of FIG. 2.

FIG. 4 is a further side view of FIG. 2, viewed down from the head of the manikin 105. In a preferred embodiment, the support surface 125 rests on a support base 400 connected to the one or more lifts 300. This allows the support surface 125 to be easily and quickly changed out, to test different support surfaces 125 with different parameters, such as firmness. As the manikin 105 is passively suspended on the suspension frame 115, it is not necessary to make frequent changes to the manikin 105 or recalibration of the one or more measuring devices 120. Since the support surface 125 is the moving element, the manikin 105 and any previous calibration or alignment can remain constant. This greatly improves repeatability and consistency in the testing and data collection process.

Preferably, once the support surface 125 is raised to meet the passively suspended manikin 105, the one or more measuring devices 120 begins registering or recording any changes in vertical height. As the manikin 105 becomes fully supported by the support surface 125, the measuring devices 120 located on the suspension frame 115 are able to determine a fully supported spinal and/or skeletal profile, as well as progressive changes in the one or more measuring points associated with each location on the spinal and/or skeletal profile, thus establishing a diagram or numerical measurements indicating the deviation of the spinal and/or skeletal profile from the centre line 205. A final measurement may be determined after the manikin 105 has stabilised on the support surface 125. As mentioned, some support surfaces such as thick mattresses may require a period of time for the weight of the manikin 105 to be fully settled into the mattress.

The recorded changes and relative differences between the one or more measurement points are used to calculate specific angles between sections of the manikin 105. These angles are able to be assessed against results from actual human subjects, or a range of acceptable limits established by medical professionals such as orthopaedic surgeons and other researchers. When the support surface 125 being tested is a mattress, these acceptable limits may indicate parameters which the measurements must meet in order to mitigate spinal, muscular, joint, or other physiological discomfort experienced during or after sleep.

In a preferred embodiment, the system 100 includes a control interface 405, wherein the control interface 405 is configured to control the raising and lowering of the support surface 125, and process electronic data received from the one or more measurement devices 120. Using the control interface 405, a user is able to operate the system 100 and test the effects of a support surface 125 on the spinal profile of a manikin 105. The control interface 405 may house electronics and processing equipment configured to calibrate the one or more measurement devices 102. The control interface 405 may also process, display, and output data recorded, indicative of changes in the one or more measurement points. The person skilled in the art will understand that the control interface 405 may be a computing device attached to the suspension frame 115 or alternatively located separately according to operator convenience and usability.

Figure 5:
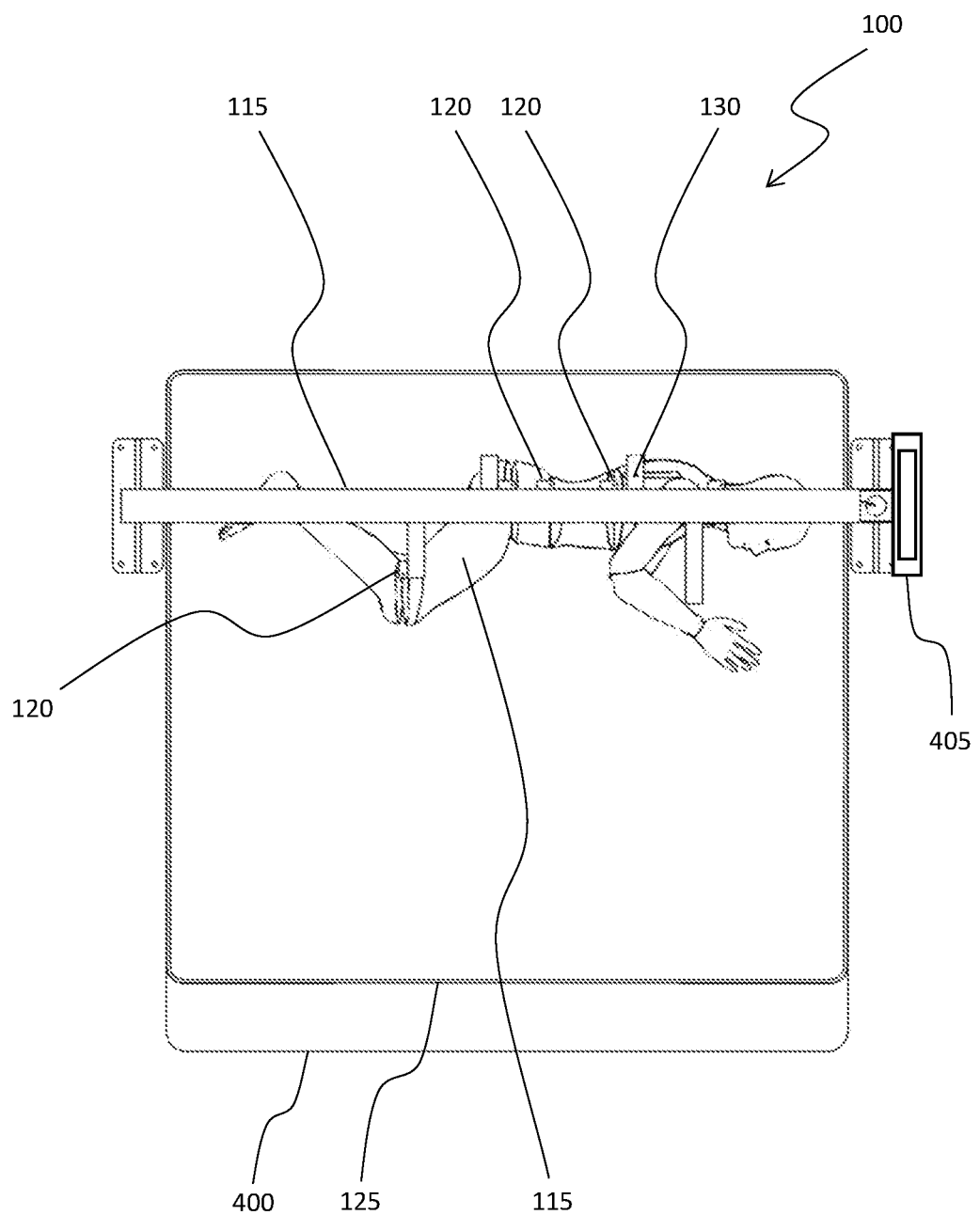
FIG. 5 is a top view of the system of FIG. 1.

FIG. 5 is a top view of the system of FIG. 1, showing a manikin 105 in the lateral position. In a preferred embodiment, the manikin 105 is an anatomically accurate human-form manikin sized to realistically represent a human being. Accordingly, the manikin 105 may be sized and weighted according to a $99^{th}$ percentile male, or the manikin 105 may be sized and weighted according to a $1^{st}$ percentile female. Optionally, the method may include sizing and weighting the manikin 105 according to a size and weight ranging between the $99^{th}$ percentile male and the $1^{st}$ percentile female. As an example, the person skilled in the art would understand that according to ergonomic studies in relation to the physical metrics of man and woman, a $95^{th}$ percentile male measures 188 cm in height and 124 kg in weight, and a $5^{th}$ percentile female measures 150 cm in height and 50 kg in weight. The use of such differently sized manikins allows testing data of each support surface 125 to represent a wide demographic coverage, providing measurement data relevant to a broad range of a human population.

In a preferred embodiment, a set of acceptable limits for assessing the changes in spinal and/or skeletal angles of the manikin profile for each manikin 105 is established. This allows the control interface 405 to determine how much spinal and/or skeletal profile deviation is caused by a particular support surface 105, and whether the deviations exceed acceptable limits. As mentioned, these acceptable limits may be established by medical research or medical professionals.

The system 100 therefore addresses at least some of the aforementioned problems, providing an accurate system to replicate and measure human physiology, assessing the effect of different surfaces on at least specific skeletal and/or spinal angles. As a system 100 to measure a manikin 105 in the lateral side sleeping position, in depth study and data collection of lateral spinal and/or skeletal profile changes can be effectively conducted and observed. In combination with medical advice and collaboration with medical professionals, impact and effects of different support surfaces 125 can be assessed and parameters of the support surfaces 125 adjusted accordingly to improve the physiological comfort and wellbeing of human users.

In this patent specification, adjectives such as first and second, left and right, top and bottom, up and down, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the scope of the above described invention, which is determined by the following claims.

The invention claimed is:

1. A system for measuring spinal and/or skeletal angles of a manikin in a lateral position, the system comprising:
   a support surface, the support surface adjustable in at least a vertical axis;
   a manikin, the manikin comprising one or more articulating joints, including articulating hip joints that hinge sideways and rotates, enabling a knee of the manikin to rest on the support surface when the manikin is in a lateral position;
   a spinal and/or skeletal profile defining a manikin profile;
   a suspension frame, the suspension frame suspending the manikin; and
   one or more measuring devices connected to the manikin at one or more measuring points;
   wherein
   the manikin comprises a suspended configuration when suspended by the suspension frame;
   the manikin comprises a supported configuration when supported by the support surface;
   the one or more measuring devices measures differences in the spinal or skeletal angles of the manikin profile between the suspended configuration and the supported configuration; and
   the one or more articulating joints are adjustable in resistance or to limit the angle of articulation.

2. The system of claim 1, wherein the spinal and/or skeletal profile in the suspended configuration is sagittal to the manikin, and the spinal and/or skeletal profile is deviated in the supported configuration.

3. The system of claim 1, wherein the support surface is raised in the vertical axis to support the manikin.

4. The system of claim 1, wherein the manikin comprises a torso, and wherein the suspension frame further comprises a vertical stabiliser connected to the torso and maintains the torso in the lateral position.

5. The system of claim 4, wherein the vertical stabiliser allows vertical movement of the torso along the vertical stabiliser.

6. The system of claim 5, wherein the vertical stabiliser allows coronal plane movement of the torso along the vertical stabiliser.

7. The system of claim 1, wherein the manikin is suspended by the suspension frame via a plurality of cords.

8. The system of claim 7, wherein the plurality of cords are tight when in the suspended configuration, and the plurality of cords are slack when in the supported configuration.

9. The system of claim 1, wherein the full weight of the manikin is on the suspension frame when in the suspended configuration, and the full weight of the manikin is on the support surface when in the supported configuration.

10. The system of claim 1, wherein the support surface is a mattress.

11. The system of claim 1, wherein the manikin comprises a head that is independently supported by a counterweight, and wherein the head is maintained in a neutral position along the spinal and/or skeletal profile.

12. The system of claim 1, wherein the one or more measuring points are located along the spinal and/or skeletal profile.

13. The system of claim 1, wherein the measuring devices are electronic devices mounted on the suspension frame and connected to the manikin at the one or more measuring points.

14. The system of claim 1, further comprising a control interface, wherein the control interface is configured to control raising and lowering of the support surface.

15. The system of claim 14, wherein the control interface is configured to process, display, and/or output data from the one or more measurement devices.

16. The system of claim 1, wherein the manikin is sized according to a size between a 99th percentile male and a 1st percentile female.

17. The system of claim 1, wherein the manikin is weighted according to a weight between a 99th percentile male and a 1st percentile female.

18. The system of claim 1, further comprising a set of acceptable limits for assessing the changes in spinal and/or skeletal angles of the manikin profile.

19. The system of claim 1, wherein the articulating hip joints are adjustable in resistance and to limit the angle of articulation.

* * * * *